US007266722B2

(12) United States Patent
Kingsbury

(10) Patent No.: US 7,266,722 B2
(45) Date of Patent: Sep. 4, 2007

(54) SYSTEM AND METHOD FOR EFFICIENT LOCK RECOVERY

(75) Inventor: Brent A. Kingsbury, Beaverton, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 619 days.

(21) Appl. No.: 10/251,893

(22) Filed: Sep. 20, 2002

(65) Prior Publication Data

US 2003/0079155 A1  Apr. 24, 2003

Related U.S. Application Data

(60) Provisional application No. 60/327,191, filed on Oct. 1, 2001, provisional application No. 60/324,787, filed on Sep. 24, 2001, provisional application No. 60/324,196, filed on Sep. 21, 2001, provisional application No. 60/324,226, filed on Sep. 21, 2001, provisional application No. 60/324,224, filed on Sep. 21, 2001, provisional application No. 60/324,242, filed on Sep. 21, 2001, provisional application No. 60/324,195, filed on Sep. 21, 2001, provisional application No. 60/324,243, filed on Sep. 21, 2001.

(51) Int. Cl.
*G06F 11/00* (2006.01)

(52) U.S. Cl. .............. 714/15; 714/19; 714/27; 707/202

(58) Field of Classification Search ............. 714/15, 714/19, 27, 26; 707/202
See application file for complete search history.

(56) References Cited

U.S. PATENT DOCUMENTS

| 5,276,872 | A |   | 1/1994  | Lomet et al. ........... 395/600 |
|-----------|---|---|---------|-------------------------------|
| 5,438,464 | A |   | 8/1995  | Lewis et al. ........... 390/73.03 |
| 5,594,863 | A | * | 1/1997  | Stiles ...................... 714/15 |
| 5,678,026 | A |   | 10/1997 | Vartti et al. ............. 395/479 |
| 5,699,500 | A | * | 12/1997 | Dasgupta ................... 714/1 |
| 5,751,992 | A |   | 5/1998  | Bhargava et al. ......... 395/457 |
| 5,813,005 | A | * | 9/1998  | Tsuchida et al. .......... 707/10 |
| 5,813,016 | A |   | 9/1998  | Sumimoto ................ 707/201 |
| 5,850,507 | A |   | 12/1998 | Ngai et al. ............... 707/202 |
| 5,909,540 | A |   | 6/1999  | Carter et al. ........ 395/182.02 |
| 5,913,227 | A |   | 6/1999  | Raz et al. ................. 711/152 |
| 5,920,872 | A |   | 7/1999  | Grewell et al. .......... 707/202 |
| 5,953,719 | A |   | 9/1999  | Kleewein et al. ........... 707/8 |

(Continued)

OTHER PUBLICATIONS

C. Mohan, Don Haderle, Brucke Lindsay, Hamid Pirahesh, and Peter Schwartz. ARIES: A Transaction Recovery Method Supporting Fine-Granulariy Locking and Partial Rollbacks Using Write-Ahead Logging. ACM, vol. 17, No. 1. Mar. 1992. 94-162.*

(Continued)

*Primary Examiner*—Scott Baderman
*Assistant Examiner*—Joshua Lohn

(57) ABSTRACT

A system and method are disclosed for providing a system and method for an efficient lock recovery. In one embodiment of the present invention, a multiple node networked system shares a resource such a shared storage. Among various other aspects of the present invention, when there is a change, such as a server failure, that prompts a recovery, the recovery can be performed in parallel among the nodes. A further aspect of an embodiment of the present invention includes recovering a lock with a higher level of exclusion prior to another lock with a lower level of exclusion.

28 Claims, 15 Drawing Sheets

U.S. PATENT DOCUMENTS

| | | | |
|---|---|---|---|
| 5,960,446 A | 9/1999 | Schmuck et al. | 711/152 |
| 5,987,506 A | 11/1999 | Carter et al. | 709/213 |
| 6,009,466 A | 12/1999 | Axberg et al. | 709/220 |
| 6,021,508 A | 2/2000 | Schmuck et al. | 714/4 |
| 6,026,474 A | 2/2000 | Carter et al. | 711/202 |
| 6,044,367 A | 3/2000 | Wolff | 707/2 |
| 6,108,654 A | 8/2000 | Chan et al. | 707/8 |
| 6,154,512 A | 11/2000 | Homan | 375/376 |
| 6,163,855 A | 12/2000 | Shrivastava et al. | 714/4 |
| 6,199,105 B1 * | 3/2001 | Soejima et al. | 709/213 |
| 6,226,717 B1 | 5/2001 | Reuter et al. | 711/147 |
| 6,237,001 B1 * | 5/2001 | Bamford et al. | 707/100 |
| 6,256,740 B1 | 7/2001 | Muller et al. | 713/201 |
| 6,269,410 B1 | 7/2001 | Spasojevic | 710/5 |
| 6,272,491 B1 | 8/2001 | Chan et al. | 707/8 |
| 6,370,625 B1 | 4/2002 | Carmean et al. | 711/152 |
| 6,421,723 B1 | 7/2002 | Tawil | 709/224 |
| 6,598,058 B2 * | 7/2003 | Bird et al. | 707/201 |
| 6,804,794 B1 * | 10/2004 | Robidoux et al. | 714/5 |
| 2001/0042221 A1 | 11/2001 | Moulton et al. | 714/5 |
| 2002/0023129 A1 * | 2/2002 | Hsiao et al. | 709/205 |
| 2002/0066051 A1 * | 5/2002 | Hobson et al. | 714/16 |
| 2002/0069340 A1 | 6/2002 | Tindal et al. | 711/203 |
| 2002/0091854 A1 | 7/2002 | Smith | 709/236 |
| 2002/0101946 A1 | 8/2002 | Hartman et al. | 375/376 |
| 2002/0150126 A1 | 10/2002 | Kovacevic | 370/503 |

OTHER PUBLICATIONS

Lomet, David; *Private Locking and Distributed Cache Management*; Proceedings of the Third International Conference on Parallel and Distributed Information Systems (PDIS 94), Austin, TX; Sep. 28-30, 1994.

* cited by examiner

SYSTEM AND METHOD FOR EFFICIENT LOCK RECOVERY

CROSS REFERENCE TO RELATED APPLICATIONS

This application claims priority to U.S. Provisional Patent Application No. 60/324,196 entitled SHARED STORAGE LOCK: A NEW SOFTWARE SYNCHRONIZATION MECHANISM FOR ENFORCING MUTUAL EXCLUSION AMONG MULTIPLE NEGOTIATORS filed Sep. 21, 2001, which is incorporated herein by reference for all purposes.

This application claims priority to U.S. Provisional Patent Application No. 60/324,226 entitled JOURNALING MECHANISM WITH EFFICIENT, SELECTIVE RECOVERY FOR MULTI-NODE ENVIRONMENTS filed Sep. 21, 2001, which is incorporated herein by reference for all purposes.

This application claims priority to U.S. Provisional Patent Application No. 60/324,224 entitled COLLABORATIVE CACHING IN A MULTI-NODE FILESYSTEM filed Sep. 21, 2001, which is incorporated herein by reference for all purposes.

This application claims priority to U.S. Provisional Patent Application No. 60/324,242 entitled DISTRIBUTED MANAGEMENT OF A STORAGE AREA NETWORK filed Sep. 21, 2001, which is incorporated herein by reference for all purposes.

This application claims priority to U.S. Provisional Patent Application No. 60/324,195 entitled METHOD FOR IMPLEMENTING JOURNALING AND DISTRIBUTED LOCK MANAGEMENT filed Sep. 21, 2001, which is incorporated herein by reference for all purposes.

This application claims priority to U.S. Provisional Patent Application No. 60/324,243 entitled MATRIX SERVER: A HIGHLY AVAILABLE MATRIX PROCESSING SYSTEM WITH COHERENT SHARED FILE STORAGE filed Sep. 21, 2001, which is incorporated herein by reference for all purposes.

This application claims priority to U.S. Provisional Patent Application No. 60/324,787 entitled A METHOD FOR EFFICIENT ON-LINE LOCK RECOVERY IN A HIGHLY AVAILABLE MATRIX PROCESSING SYSTEM filed Sep. 24, 2001, which is incorporated herein by reference for all purposes.

This application claims priority to U.S. Provisional Patent Application No. 60/327,191 entitled FAST LOCK RECOVERY: A METHOD FOR EFFICIENT ON-LINE LOCK RECOVERY IN A HIGHLY AVAILABLE MATRIX PROCESSING SYSTEM filed Oct. 1, 2001, which is incorporated herein by reference for all purposes.

This application is related to co-pending U.S. patent application Ser. No. 10/251,689 entitled A SYSTEM AND METHOD FOR SYNCHRONIZATION FOR ENFORCING MUTUAL EXCLUSION AMONG MULTIPLE NEGOTIATORS filed concurrently herewith, which is incorporated herein by reference for all purposes; and co-pending U.S. patent application Ser. No. 10/251,626 entitled SYSTEM AND METHOD FOR JOURNAL RECOVERY FOR MULTINODE ENVIRONMENTS filed concurrently herewith, which is incorporated herein by reference for all purposes; and co-pending U.S. patent application Ser. No. 10/251,645 entitled A SYSTEM AND METHOD FOR COLLABORATIVE CACHING IN A MULTINODE SYSTEM filed concurrently herewith, which is incorporated herein by reference for all purposes; and co-pending U.S. patent application Ser. No. 10/251,690 entitled A SYSTEM AND METHOD FOR MANAGEMENT OF A STORAGE AREA NETWORK filed concurrently herewith, which is incorporated herein by reference for all purposes; and co-pending U.S. patent application Ser. No. 10/251,894 entitled SYSTEM AND METHOD FOR IMPLEMENTING JOURNALING IN A MULTI-NODE ENVIRONMENT filed concurrently herewith, which is incorporated herein by reference for all purposes; and co-pending U.S. patent application Ser. No. 10/251,895 entitled A SYSTEM AND METHOD FOR A MULTI-NODE ENVIRONMENT WITH SHARED STORAGE filed concurrently herewith, which is incorporated herein by reference for all purposes.

FIELD OF THE INVENTION

The present invention relates generally to computer systems. In particular, the present invention relates to computer systems that share resources such as storage.

BACKGROUND OF THE INVENTION

In complex networked systems, multiple nodes may be set up to share data storage. Preferably, in order to share storage, only one node or application is allowed to alter data at any given time. In order to accomplish this synchronization, locks that provide the necessary mutual exclusion may be used.

Frequently such locks can be managed by a single node of the network system. This single node can be a separate computer dedicated to managing a lock for the other nodes. In such a configuration, each of the other nodes in the networked system is required to communicate with the lock manager node in order to access the locks. A potential problem occurs if the lock manager node crashes, losing the locking mechanism.

It would be desirable to be able to recover the lock states after a crash of a node that was managing the locks so that the locks can properly be synchronized. The present invention addresses such a need.

BRIEF DESCRIPTION OF THE DRAWINGS

The present invention will be readily understood by the following detailed description in conjunction with the accompanying drawings, wherein like reference numerals designate like structural elements, and in which:

FIGS. 5A-5I are additional flow diagrams of a method according to a method of the present invention for recovering locks.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
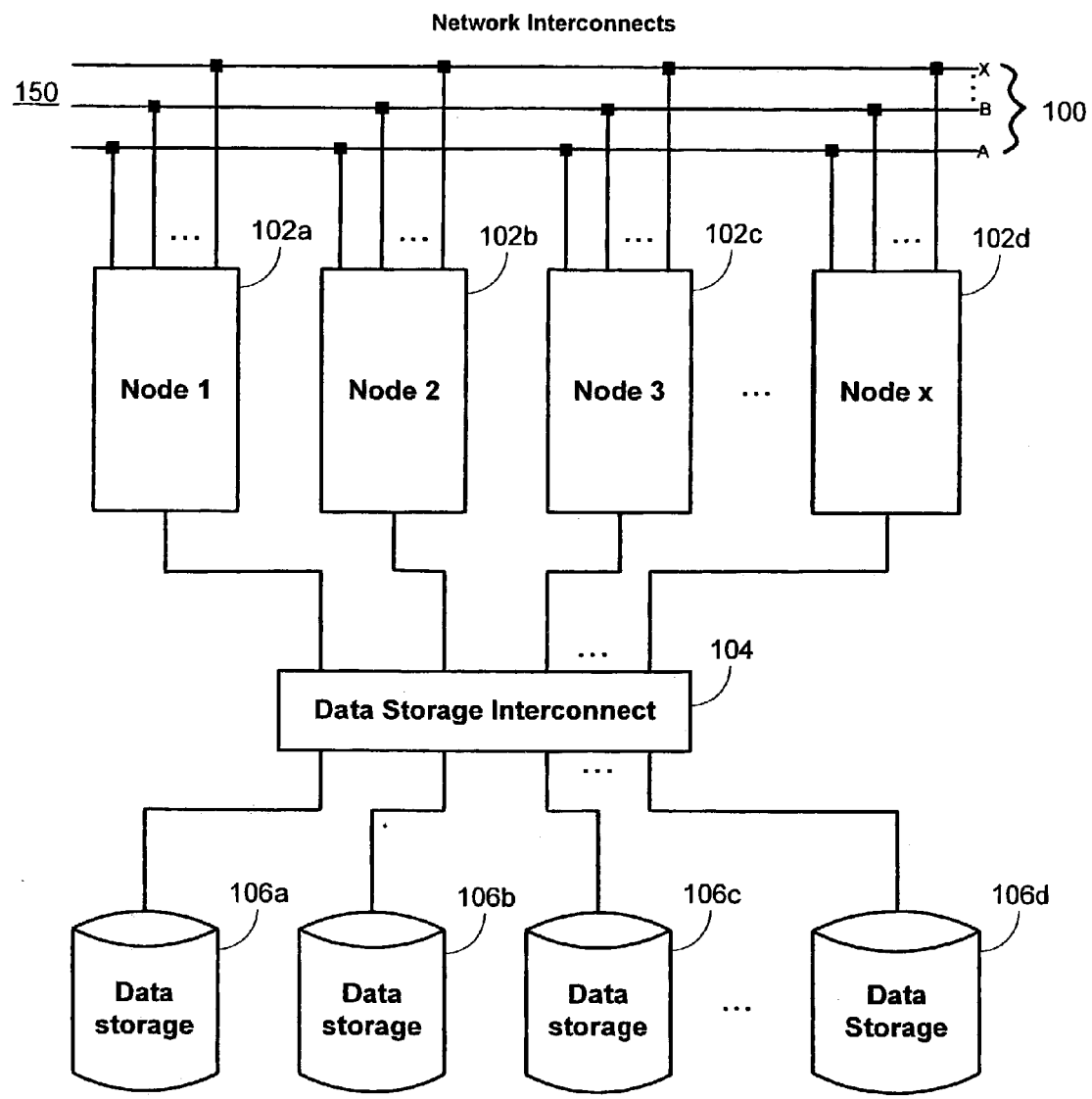
FIG. 1 is a block diagram of a shared storage system suitable for applying the lock recovery mechanism according to an embodiment of the present invention.

FIG. 1 is a block diagram of a shared storage system suitable for applying the lock recovery mechanism according to an embodiment of the present invention. FIG. 1 shows a shared storage system 150. In this example, nodes 102A-102D are coupled together through a network switch 100. The network switch 100 can represent any network infrastructure such as a 10 Mb or 100 Mb Ethernet, Gigabit Ethernet, Infiniband, etc. Additionally, the nodes 102A-102D are also shown to be coupled to a data storage interconnect 104. An example of the data storage interconnect 104 may be Infiniband, FibreChannel, iSCSI, shared SCSI, wireless, infra-red communication links, proprietary interconnects, etc. Examples of nodes 102A-102D include but are not limited to computers, servers, and any other processing units or applications that can share storage or data. The data interconnect 104 is shown to be coupled to shared storage 106A-106D. Examples of shared storage 106A-106D include any form of storage such as hard drive disks, compact disks, tape, and random access memory.

Although the system shown in FIG. 1 is a multiple node system, the present invention can also be used with a single computer system for synchronizing various applications as they share data on shared storage.

Figure 2:
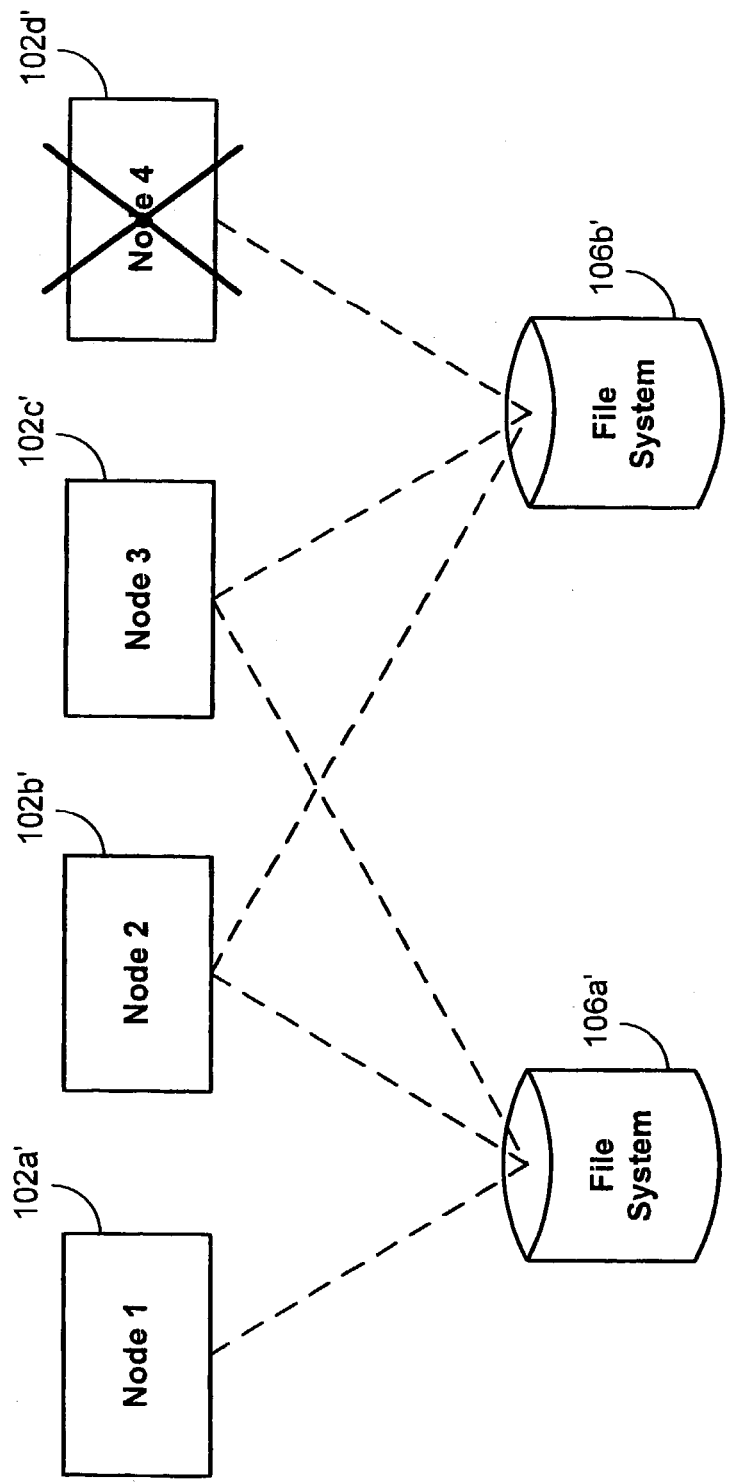
FIG. 2 is a block diagram of a situation in which recovery would be desirable according to an embodiment of the present invention.

FIG. 2 is a block diagram of a situation in which recovery would be desirable according to an embodiment of the present invention. In this example, nodes 102A'-102D' are shown to have mounted file systems 106A'-106B'. The term "mounted" is used herein to describe a file system 106A'-106B' that is accessible to a particular node. In this example, node 102A' has mounted file system 106A', node 102B' has mounted both file systems 106A' and 106B', node 102C' has also mounted both file systems 106A' and 106B', and node 102D' has mounted file system 106B'. File systems 106A'-106B' correspond, in this example, to file system structures of data storage 106A-106D of FIG. 1.

Shared storage can be any storage device, such as hard drive disks, compact disks, tape, and random access memory. A filesystem is a logical entity built on the shared storage. Although the shared storage is typically considered a physical device while the filesystem is typically considered a logical structure overlaid on part of the storage, the filesystem is sometimes referred to herein as shared storage for simplicity. For example, when it is stated that shared storage fails, it can be a failure of a part of a filesystem, one or more filesystems, or the physical storage device on which the filesystem is overlaid. Accordingly, shared storage, as used herein, can mean the physical storage device, a portion of a filesystem, a filesystem, filesystems, or any combination thereof.

In FIG. 2 it is shown that node 102D' has failed in some form. Any failure to communicate with the other nodes can be a reason to recover locks. For example, node 102D' may have crashed, it may have been unplugged, had a power outage, or a communication interconnect may have been severed either on purpose or accidentally. Other examples of catalysts for lock recovery include panic or catatonic state of the operating system on a node, failure of network interconnection hardware or software, general software failures, graceful or forced unmount of a shared file system by a node, failure of a storage interconnect or a storage device. Another possible catalyst for a lock recovery is when a node is added to the shared storage system, such as the shared storage system shown in FIG. 1, and that additional node unbalances the number of nodes currently participating as lock home nodes versus non-home nodes. A heavily imbalanced system will not scale in work load as well as a balanced system, and recovery of the locks may be desirable in this situation. A lock home node, as used herein, is the server that is responsible for granting or denying lock requests for a given DLM lock when there is no cached sufficient lock reference available on the requesting node. In this embodiment, there is one lock home node per lock. The home node does not necessarily hold the lock locked but if other nodes hold the lock locked or cached, then the home node has a description of the lock since the other nodes that hold the lock locked or cached communicated with the home node of the lock in order to get it locked or cached.

Figure 3:
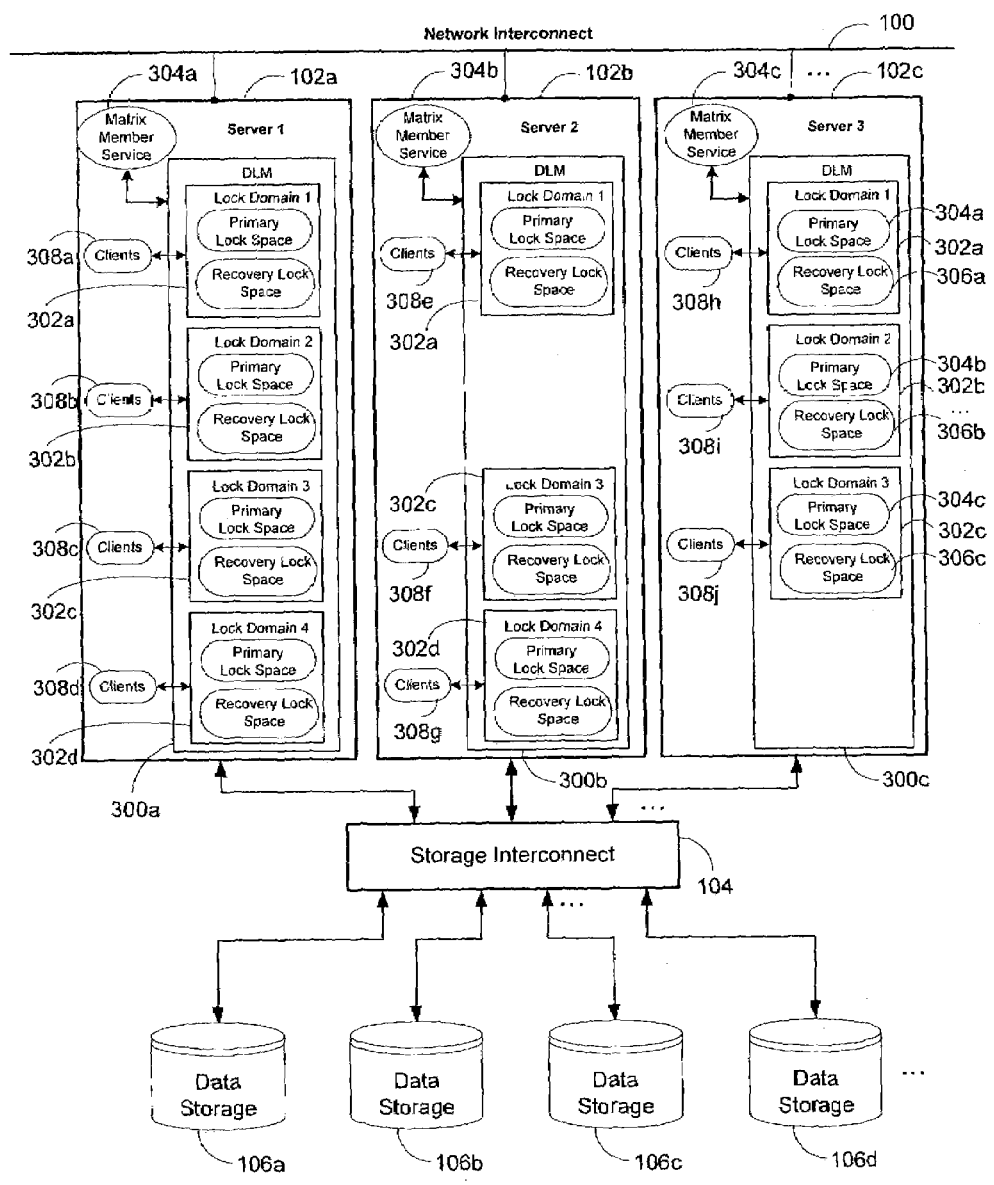
FIG. 3 is a block diagram of software components associated with nodes according to an embodiment of the present invention.

FIG. 3 is a block diagram of software components associated with nodes according to an embodiment of the present invention. In this example, nodes 102A-102C are shown to be servers. They are connected through a network interconnect 100, as well as the storage interconnect 104 that couples the nodes 102A-102C to the shared storage 106A-106D. Each of the nodes 102A-102C are shown to include a distributed lock manager (DLM) 300A-300C. Accordingly, rather than having a centralized lock manager that is located in a single node and forcing the other nodes to communicate through it, the system shown in FIG. 3 includes more than one node with a lock manager 300A. According to an embodiment of the present invention, each node that is configured to be able to access the shared storage 106A-106D includes a distributed lock manger 300A-300C.

The DLM is shown to include lock domains 302A-302D. Such a lock domain, as used herein, includes the context in which a shared resource, such as a shared file system, is associated with a set of locks used to coordinate access to the resource by potential contenders such as nodes 102A-102C. Locking operations related to a particular file system are contained in the lock domain that is associated with that file system. In this embodiment, there is one lock domain per shared resource requiring coordinated access. For example, node 102A is shown to include lock domains 302A-302D so that node 102A has access to shared storage 106A-106D. Node 102B is shown to include lock domains 302A, 302C, and 302D, which correspond to having access to shared storage 106A, 106C, and 106D. Likewise, node 102C is shown to include lock domains 302A, 302B, and 302C, which allows access to shared storage 106A, 106B, and 106C. Within each lock domain, there is shown a primary lock space, such as lock space 304A, and recovery lock space such as lock space. 306A. Further details of the primary lock space 304A and recovery lock space 306A will later be discussed in conjunction with the remaining figures. Nodes 102A-102C are also shown to include clients 308A-308J.

The clients 308A-308J, as used herein, are software or hardware components that can issue lock requests to the DLM and receive lock grants from the DLM. An example of a client 308A for DLM 300A is a file system module software running on node 102A with respect to a specific file system that the node has mounted. In the example shown in FIG. 3, each client 308A-308J represents a mounted file system on a specific node, managed by the logic of the file system module which runs locally on that node. The file system module software issues the necessary lock requests to the DLM instance also running on that node. In turn, each DLM can communicate with its neighboring DLM instances.

Each DLM instance may have many clients. Nodes 102A-102C are also shown to include matrix membership service 304A-304C. The matrix membership service (MMS) monitors the membership list of each lock domain 302A-302D, and communicates lock domain membership changes to each of the DLMs 300A-300C. The domain membership list is a list of all nodes, servers in this example, participating in lock negotiation in a given lock domain. This list is maintained and updated by the matrix membership service 304A-304C.

According to an embodiment of the present invention, nodes of a cluster use a locking mechanism implemented by a distributed lock manager (DLM), to coordinate access and updates to shared data, e.g., shared file system data residing in a storage subsystem accessible to each of the nodes in the cluster. Nodes obtain locks covering the shared data that they wish to use or modify, and this ensures that other nodes will not modify such data simultaneously or incoherently. Each node of the cluster is thus able to always see a consistent view of the shared data structures even in the presence of updates being performed by other nodes.

So long as the node membership of the cluster is unchanged, i.e., no nodes are added or subtracted from the cluster, the locking operations required to provide the coherency of the shared data occur in an environment in which all lock state is known. The unexpected failure, however, of one or more nodes requires the DLM to perform lock recovery, as all locks held by the failed nodes must be released, and awarded to other nodes requesting the locks that were held previously by the failed nodes. Depending upon the circumstances, the lock recovery operation may also need to be coordinated with the software or hardware components using the locking services provided by the DLM, to properly repair shared data state rendered incoherent by the presence of incomplete modifications against the shared data that were in progress at the time of the node failure(s).

A lock recovery may also be required when nodes are administratively removed from, or in some cases added to the cluster, depending upon certain implementation choices of both the lock manager and the components that use the locking services provided by the DLM.

Figure 4:
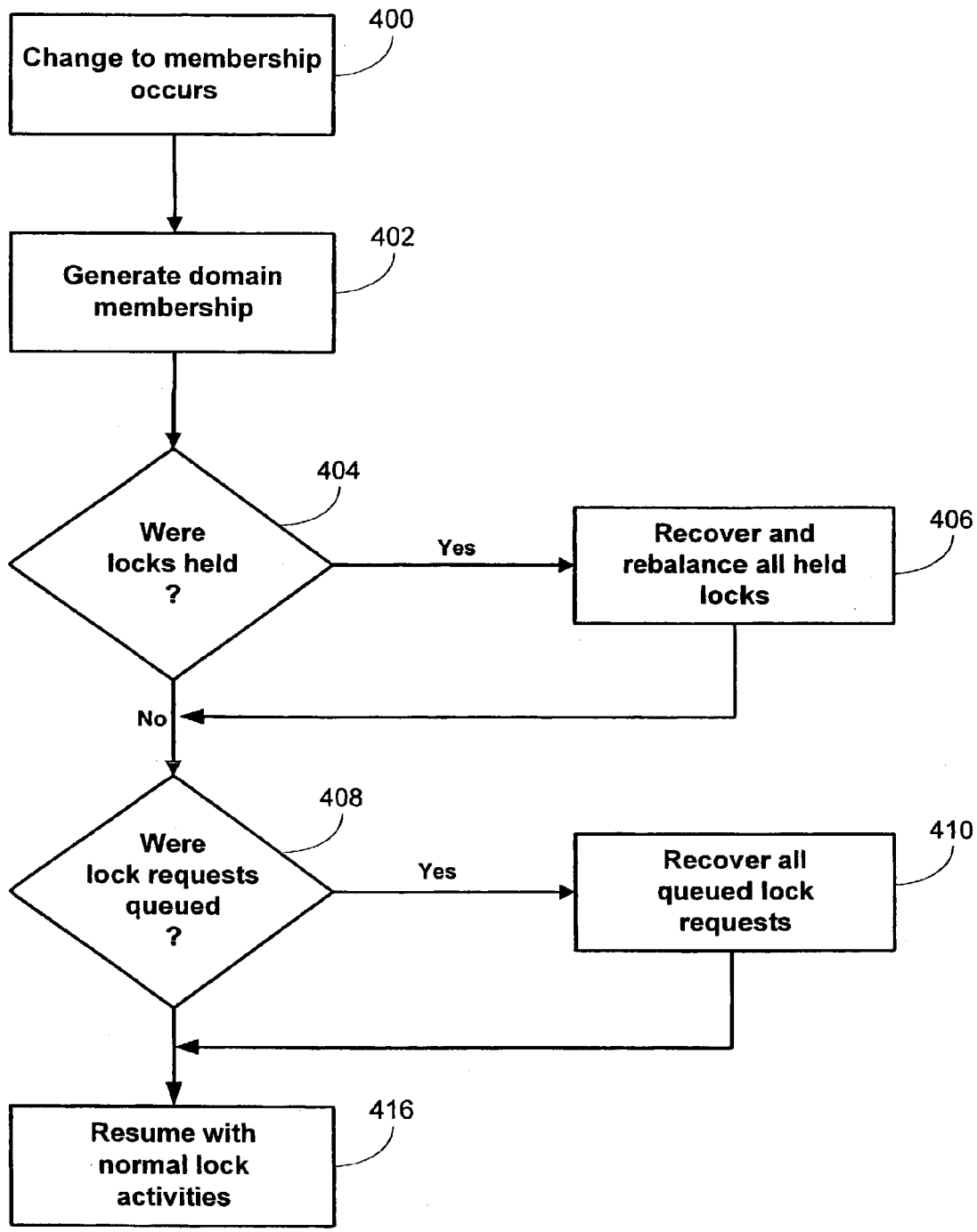
FIG. 4 is a flow diagram of a method according to an embodiment of the present invention for recovering locks.

FIG. 4 is a flow diagram of a method according to an embodiment of the present invention for recovering locks. In this example, a change to the membership of a lock domain occurs (400). In the example shown in FIG. 3, a change occurs in the domain membership list maintained by the matrix membership service 304A-304C which lists all the servers participating in lock negotiation in a given lock domain. For example, if node 102C is taken off line, either due to failure or on purpose, then there would be a change to the domain membership list of lock domains 302A, 302B, and 302C. The change to the domain membership list would exclude node 102C in this example. Similarly, the addition of a node to a cluster can be interpreted as a change in membership, when the new node begins to use the shared storage of the cluster.

A new domain membership list is generated (402). For example, for the new domain membership of lock domain 302A, the members would now include 102A and 102B and would no longer include the failed node 102C of FIG. 3.

It is then determined whether there were any locks held (404) prior to the generation of the new domain membership (402). If locks were held, then these locks are recovered and rebalanced (406). Further details of the recovery and rebalancing of the held locks will be discussed later in conjunction with the remaining figures.

If no locks were held, or they have been recovered, it is determined whether there were queued lock requests (408) prior to the generation of the new domain membership (402). If there were queued lock requests, then these lock requests are recovered (410).

Thereafter, normal lock activities are resumed (416).

The same method that was used to originally acquire the locks can be used to reacquire the locks at the recovery stage. Accordingly, the same program logic used to acquire the locks can be used at the recovery stage. Methods for acquiring locks during normal DLM operation when the node membership state of the containing lock domain is not changing, are well known in the art and these acquisition methods can be used in conjunction with the present invention.

FIGS. 5A-5I are additional flow diagrams of a method according to an embodiment of the present invention for recovering locks. In this example, assume that a change in membership occurs. For each lock domain affected by the change in membership, the method exemplified by FIGS. 5A-5I can be executed concurrently.

A new membership set for a specific lock domain is sent to the DLM of all nodes previously in the set as well as all nodes added to the set. (500). For each such recipient node's DLM, it is then determined whether a lock recovery for the lock domain was already in progress (502). For example, a node may have been added to the new membership set during a recovery procedure. If a lock recovery for the lock domain was already in progress, then all lock recovery states for the interrupted lock recovery is deleted (504). It is then determined whether the recipient node is present in the new membership set for the lock domain (506). If, however, a lock recovery for the lock domain was not already in progress (502), then it is determined whether the recipient node is present in the new membership set for the lock domain (506). If the recipient node is not present in the new membership set, then the clients of the lock domain on the node of the recipient DLM are informed that they have been removed from the domain membership (508). The lock domain and all its lock states are then deleted (510).

Figure 5A:
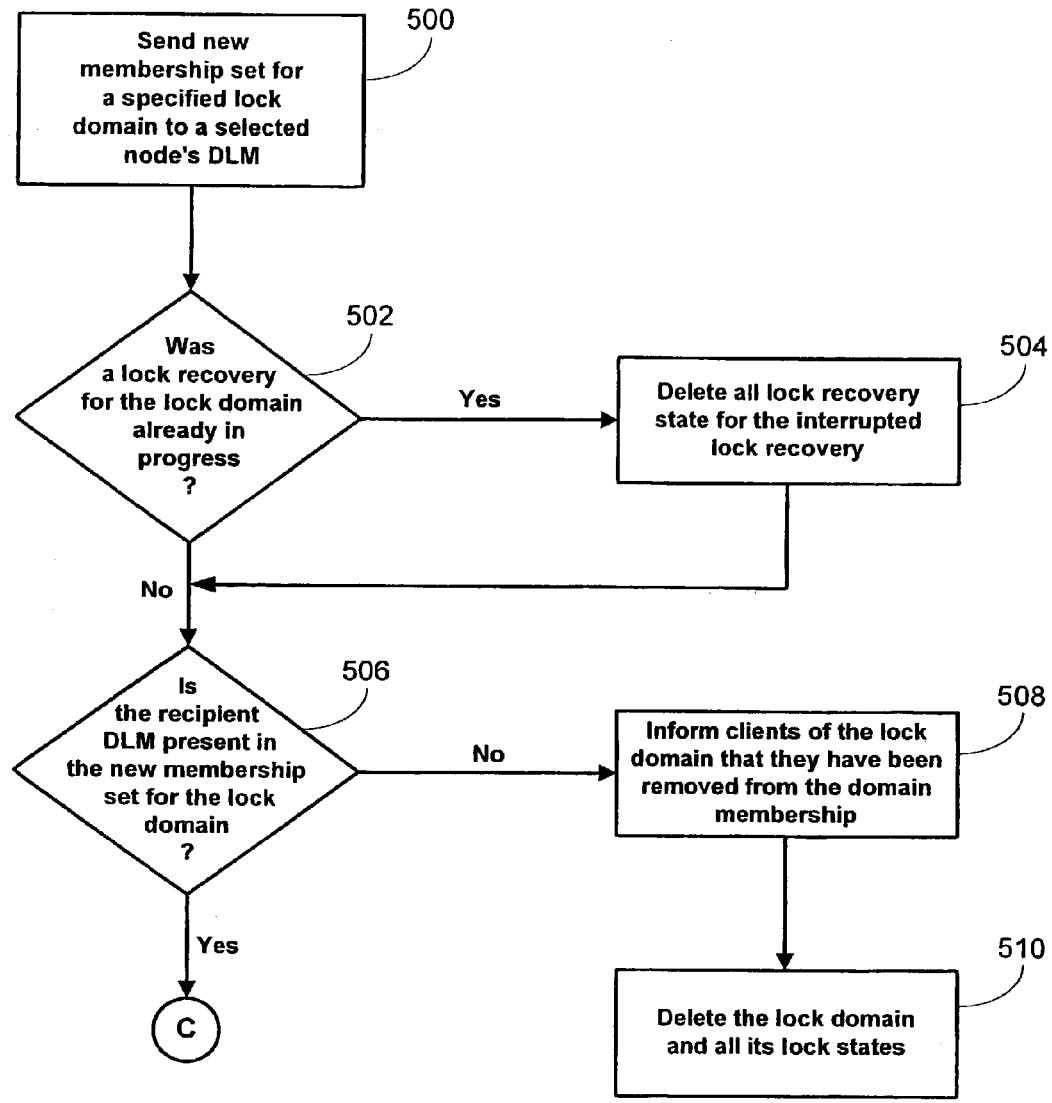
Figure 5B:
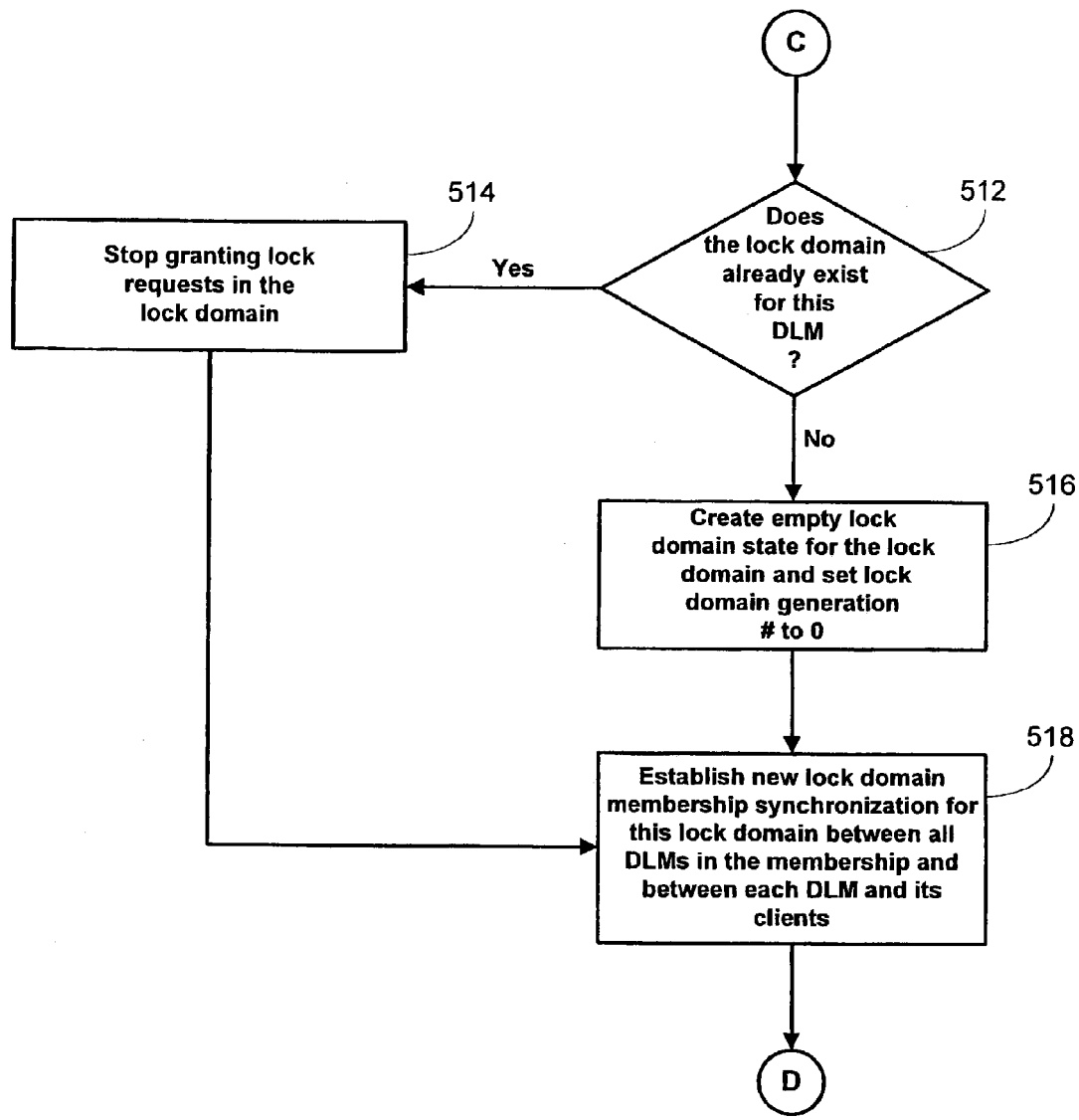

If the recipient node is present in the new membership set for the lock domain (506), then it is determined whether the lock domain already exists for this DLM (512 of FIG. 5B). If the lock domain already exists for this DLM (512), then lock requests in the lock domain received by the DLM from the local clients after notification of the lock domain's membership change are merely queued for later completion during lock recovery (514). New lock domain membership generation and synchronization are then established for this lock domain between all DLMs in the membership and between each DLM and its clients (518).

If the lock domain does not already exists for this DLM (512), then the recipient node is being added to the lock domain, and an empty lock domain state is created for the lock domain, and the lock domain generation number is set to zero (516). A new lock domain membership synchronization is established for this lock domain between all DLMs in the membership and between each DLM and its clients (518). Further details of this synchronization is later discussed in conjunction with FIG. 5F.

Figure 5C:
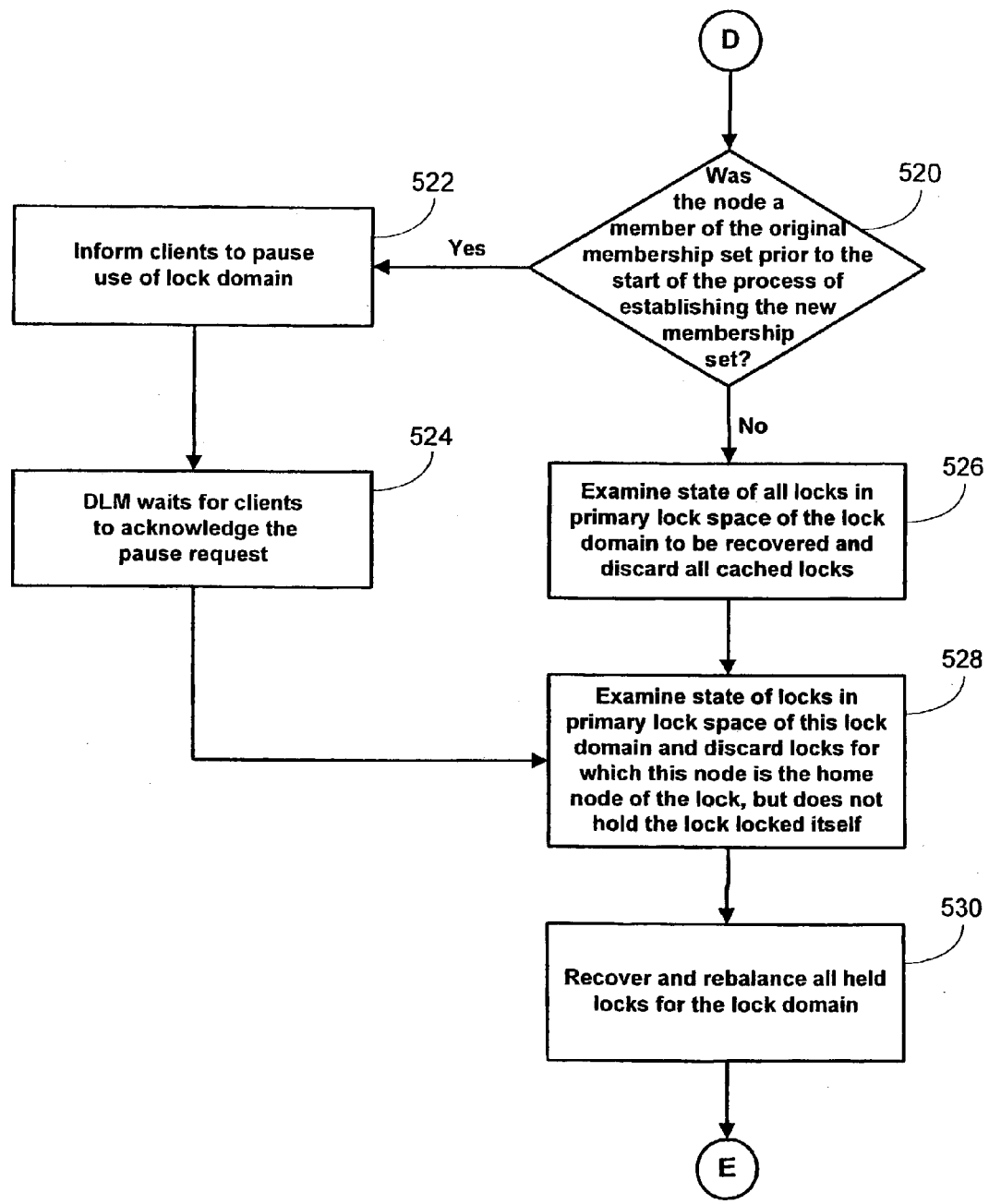

It is then determined whether the node was a member of the original membership set prior to the start of the process of establishing the new membership set (520 of FIG. 5C). If the node was a member of the original membership set, then its clients are informed to pause (temporarily suspend) the use of the lock domain (522). The DLM then waits for the clients to acknowledge the pause request (524). Any client acknowledgement messages which do not contain the latest lock domain generation number are ignored. The state of all locks in primary lock space of the lock domain is then examined and all cached locks are discarded (526). Thereafter, the method continues to step 528.

If the node was not a member of the original membership (520), then the state of all locks in primary lock space of the lock domain are examined and all cached locks are discarded (526).

Similarly, all locks in the primary lock space of the lock domain are discarded for which this node is the home node of the lock but does not hold the lock locked itself (528). Steps 526 and 528 can be performed in the reverse order of what is shown in this example, or they can be performed simultaneously.

All held locks for the locked domain are then recovered and rebalanced (530). This lock recovery and rebalancing may result in a lock being granted or denied. However, the clients are not yet informed about the granting/denial of the locks. Instead, the delivery of such information is queued for step 548.

When there is a change in the membership, the home node will generally change during the recovery phase, automatically rebalancing the locks. Balance, as used herein, denotes that the home node has approximately equal probability of being in any particular node.

In one embodiment, the home node can be assigned for a particular lock at the time the lock is requested. For example, to identify the new lock home node for each recovered lock, a hash algorithm can be used to convert the existing lock name into an integer, modulo the number of nodes in the new domain membership list. Thus the lock home node can always be determined based solely on the name of the lock. Since all DLMs have the same domain membership list, the same lock names, and the same hash algorithm to discover the lock home node, all DLMs will reach the same conclusion regarding the new lock home nodes for every lock.

Further details of the recovery and rebalance of locks are later discussed in conjunction with FIGS. 5G-5H.

All queued lock requests for the lock domain are then recovered (532). As with step 530, this recovery may result in a lock being granted or denied as in step 530. Again, the clients are not yet informed about the granting of the locks and the delivery of such information is queued for step 548. Further details of this recovery will later be discussed in conjunction with FIGS. 5I.

The recovery lock space is now made the primary lock space and all lock space in the old primary lock space is discarded (534). It is then determined whether this node is the recovery coordinator node (536). Further details of the recovery coordinator will later be discussed in conjunction with FIG. 5F. If it is not the recovery coordinator, then the recovery coordinator node is informed that this node has requeued all previously queued requests (538). Clients are then informed of the new membership set for the lock domain (542 of FIG. 5E).

If this node is the recovery coordinator node (536), then it waits for all other nodes in the membership to report that they have requeued their previously queued lock requests for the lock domain (540). Clients are then informed of the new membership set for the lock domain (542 of FIG. 5E). It is then determined whether to do a client recovery (544). If a client recovery should be performed, the node informs its clients to begin recovery and it waits for all clients to complete their recovery (546). Details of the client recovery are client specific and it is up to each client to implement its recovery.

Normal operation of the lock domain is then resumed and the clients are informed accordingly (548). If no recovery is necessary, then normal operation of the lock domain is then resumed and the clients are informed accordingly (548). Determination of when a client recovery is necessary is client specific. However, client recovery is generally required when an unexpected membership change occurs, such as a node crashing.

Normal operation includes notifying the clients of any lock grants or denials, or any other queued lock state updates that might have occurred during lock recovery.

Figure 5D:
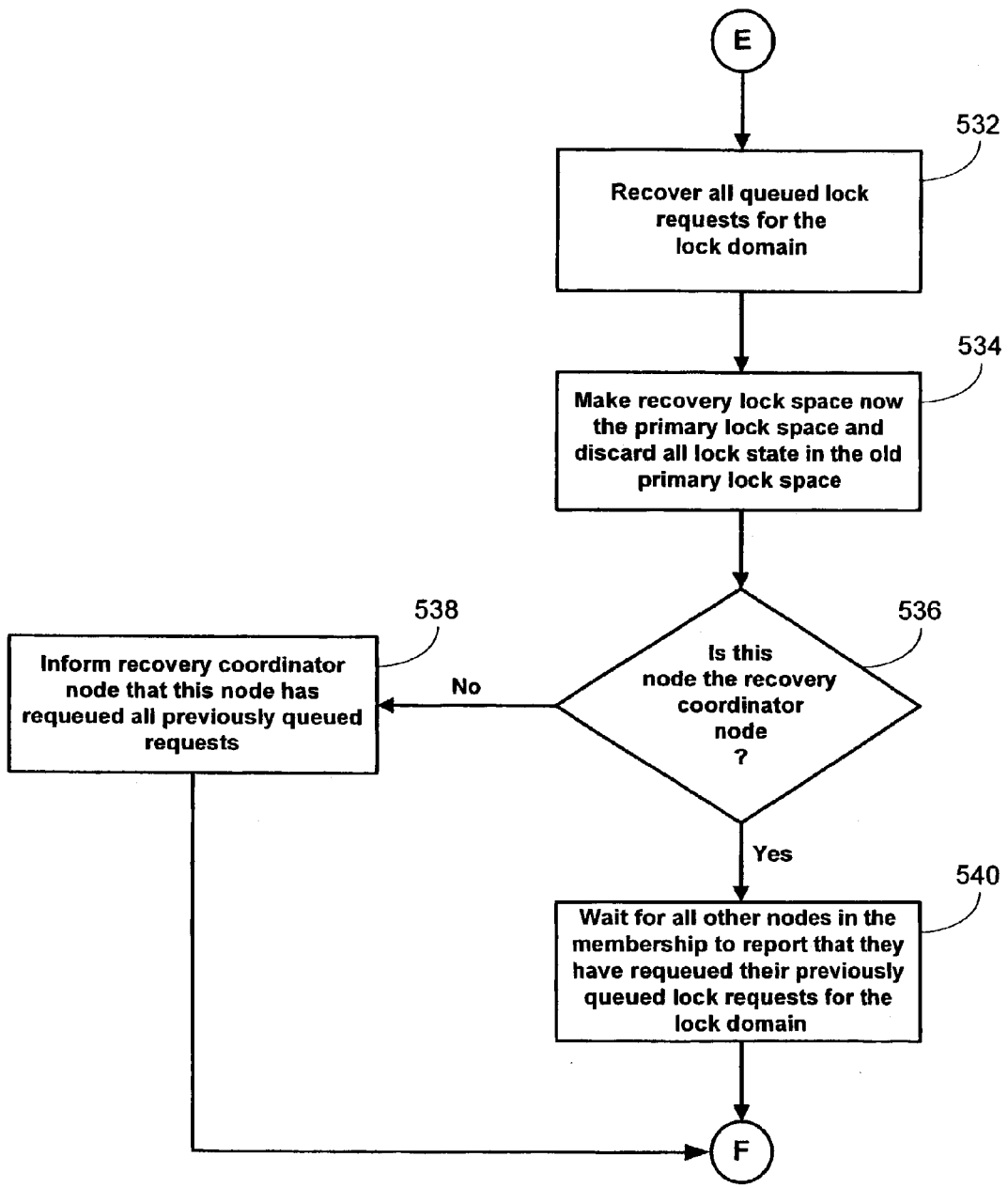
Figure 5E:
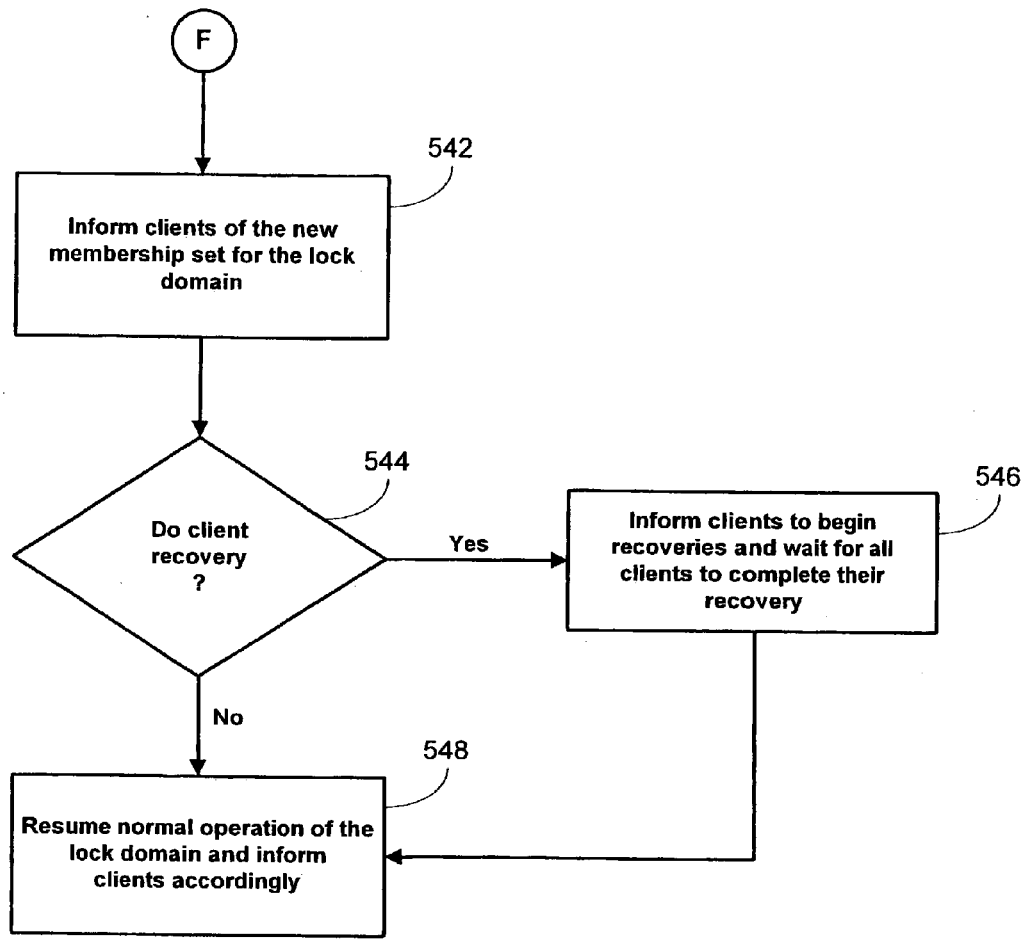
Figure 5F:
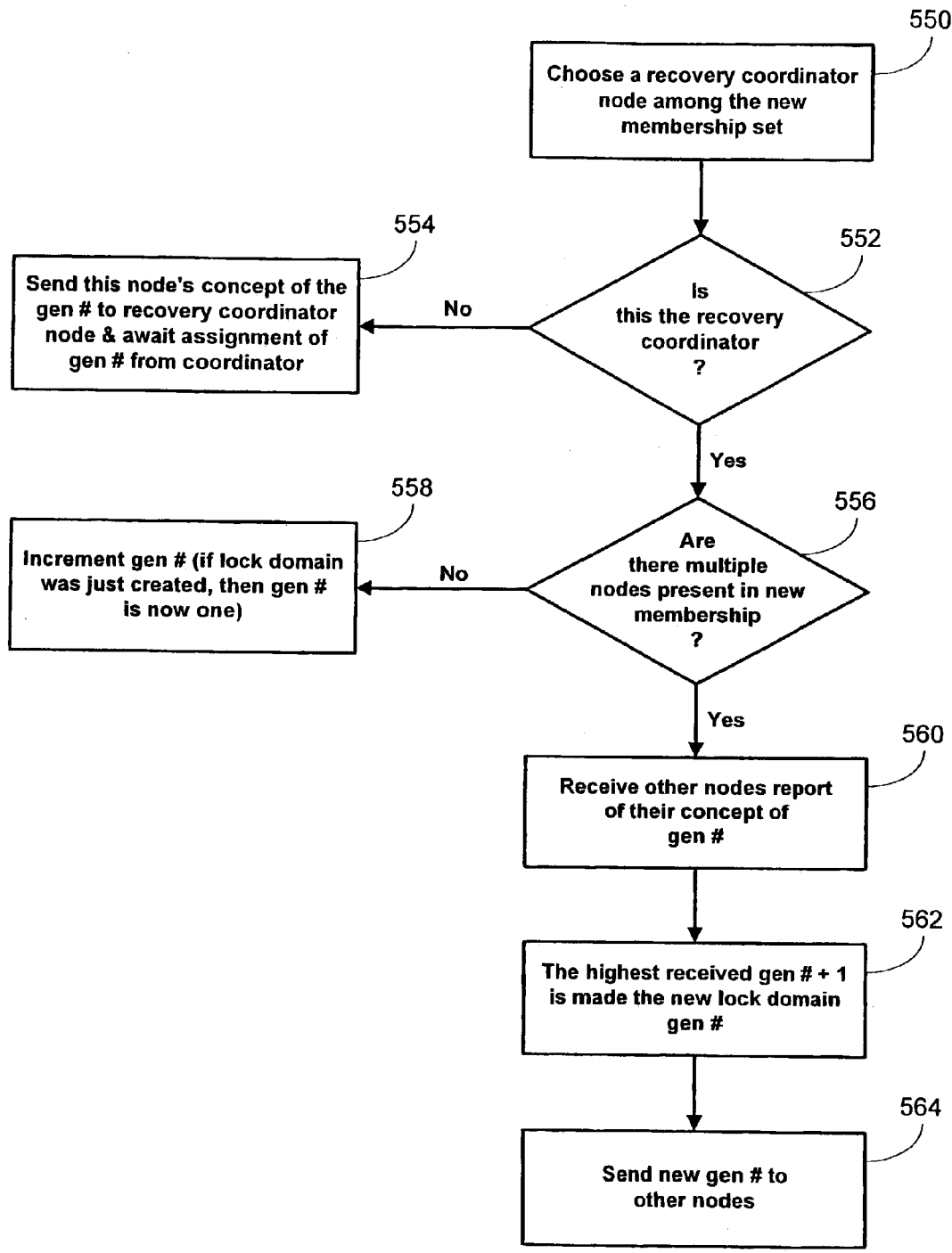

FIG. 5F is a flow diagram illustrating step 518 of FIG. 5D for establishing the new lock domain membership synchronization between the DLMs in the membership and between each DLM and its clients. In this example, a recovery coordinator node is selected among the new membership (550). There are many ways to select a recovery coordinator node. Examples include selecting the first node in the membership set, selecting the last node in the membership set, or selecting the node with the lowest or highest network address among the member nodes. If there is only one node in the new membership set, the one node is the recovery coordinator node.

It is then determined whether this node is the recovery coordinator (552). If this node is not the recovery coordinator, then this node's concept of the generation number is sent to the recovery coordinator node and this node awaits assignment of the latest generation node from the coordinator (554).

If this node is the recovery coordinator (552), then it is determined whether there are multiple nodes present in the new membership (556). If there is only one node, then the generation number is incremented (558). If the lock domain has just been created, then the generation number is now 1.

If there are multiple nodes present in the new membership (556), then the recovery coordinator receives the other node's reports of their concept of the generation number (560). The highest generation number plus 1 is then made the new lock domain generation number (562). The new generation number is then sent to the other nodes in the membership (564). This new generation number is preferably included in all subsequent lock message traffic for the lock domain. In this manner, stale out-of-date lock traffic messages pertaining to previous lock domain membership sets can be detected and ignored.

Figure 5G:
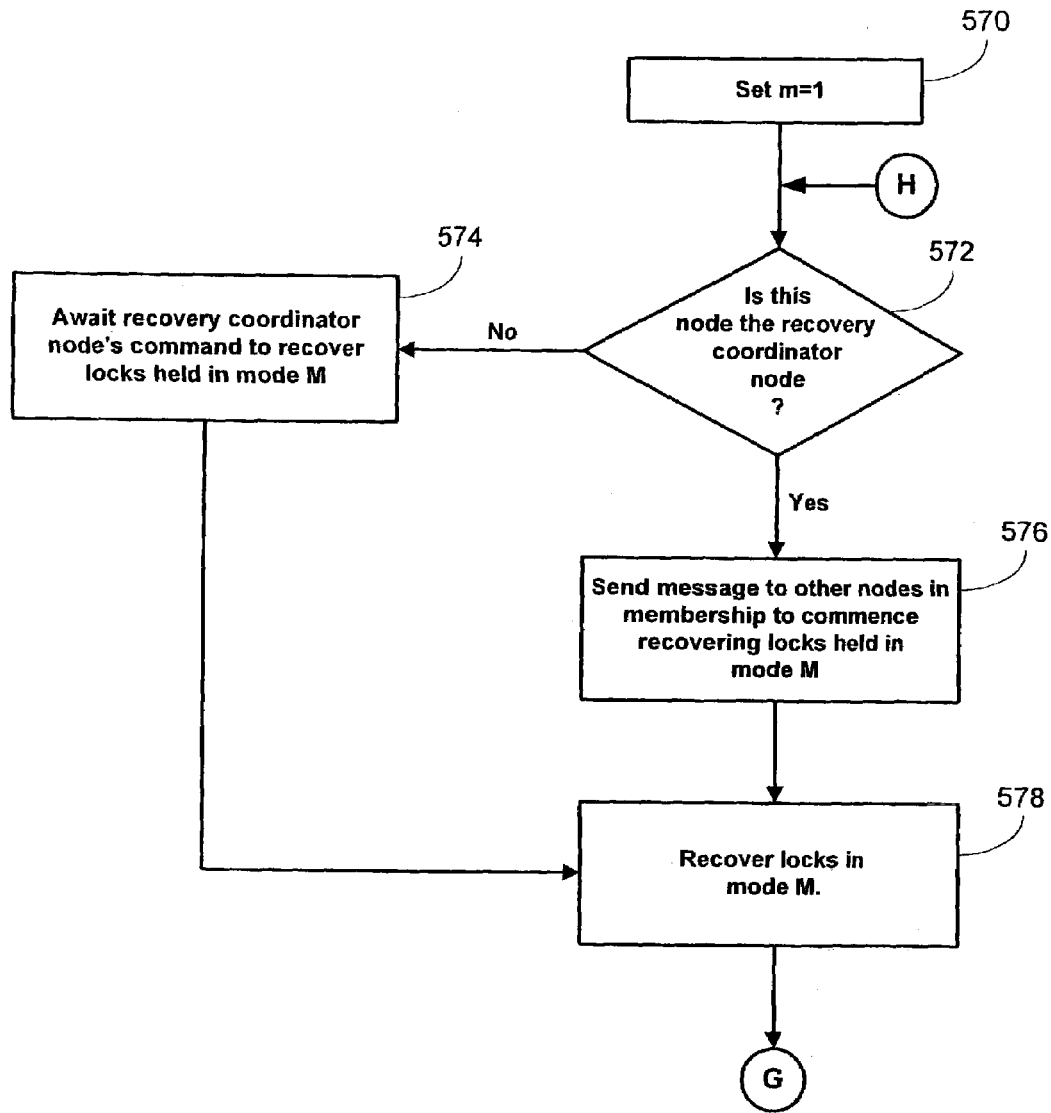
Figure 5H:
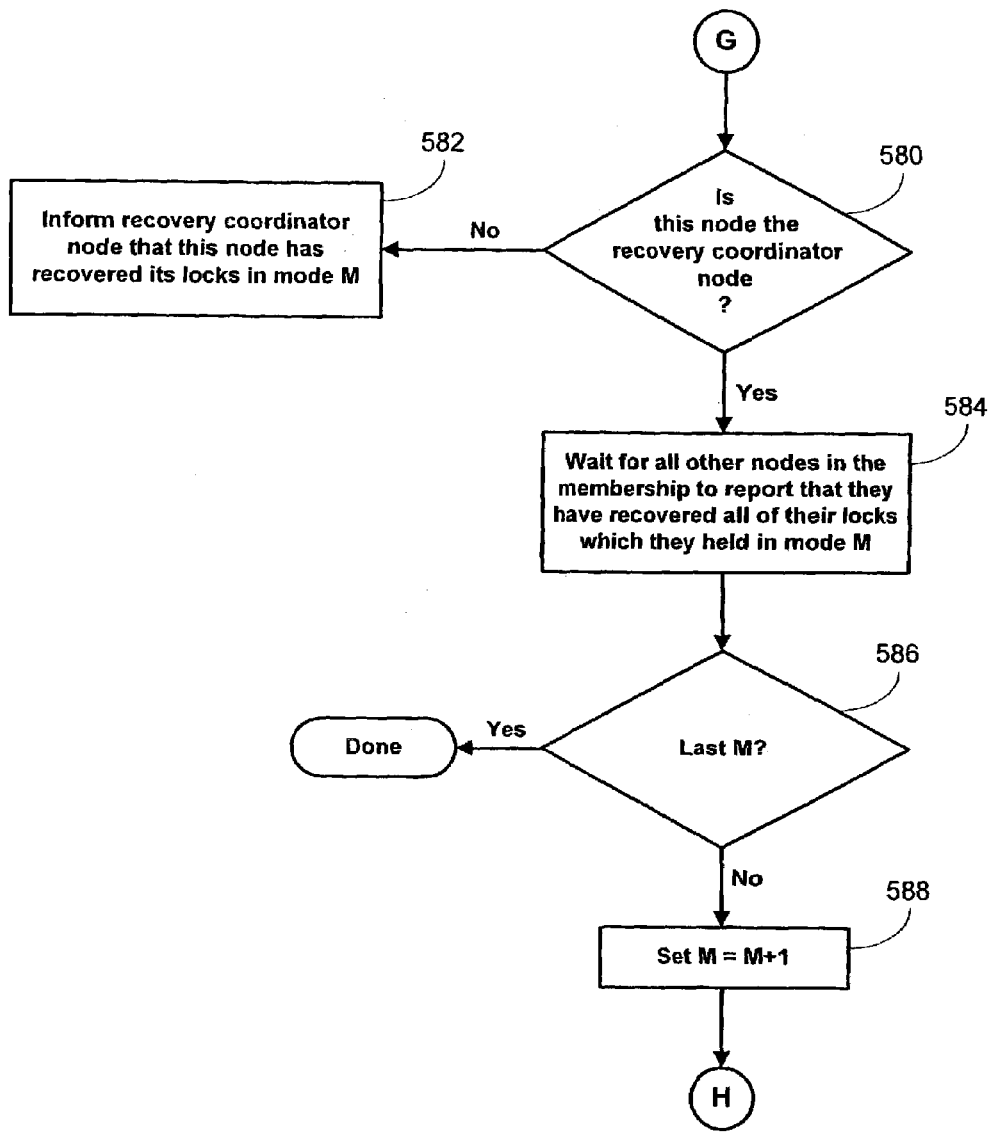
Figure 51:
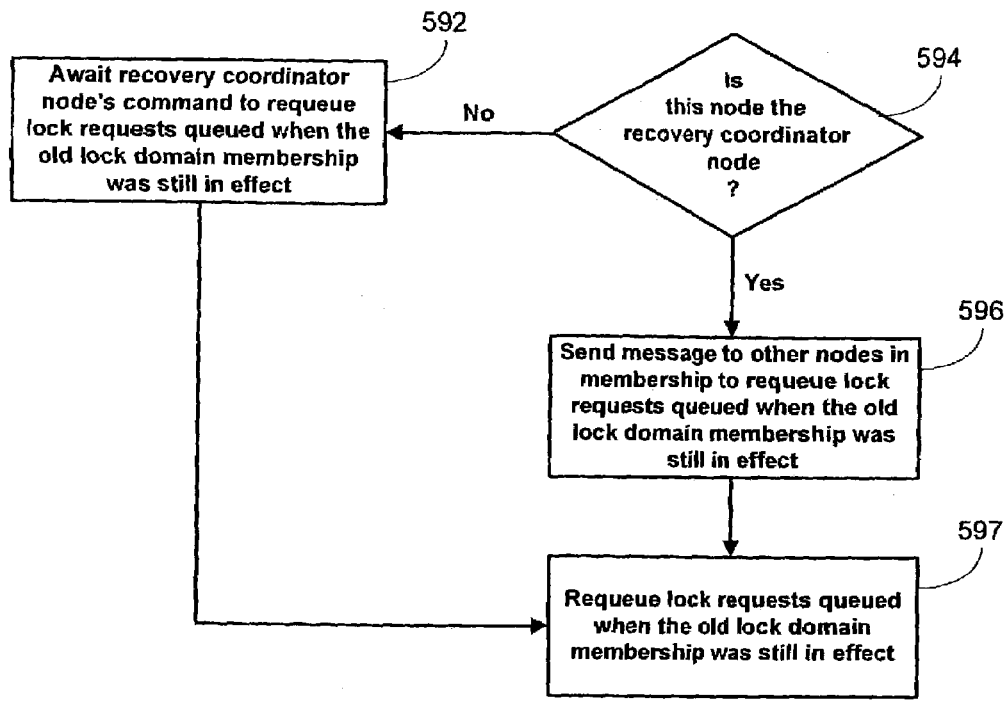

FIGS. 5G-5H are a flow diagram illustrating step 530 of FIG. 5D for recovering all queued lock requests for the lock domain. In this example, M is the lock mode hierarchy level. Assume 1 is the most exclusive mutual exclusion level, 2 is the second most exclusive exclusion level, etc. For example, if there are only two exclusion levels, a read (stored) lock and a write (exclusive) lock, then M=1 would imply a write lock.

The example shown in FIG. 5G begins with setting M=1 (570). It is then determined whether this node is the recovery coordinator node (572). If this node is not the recovery coordinator node, then this node awaits the recovery coordinator node's command to recover locks held in mode M (574). The locks are then recovered in mode M (578).

If this node is the recovery coordinator node (572), then a message is sent to the other nodes in the membership to commence recovering locks held in Mode M (576). The locks are then recovered in mode M (578). This recovery is accomplished using the same mechanisms and algorithms used to acquire locks when the lock membership is unchanging (i.e. when no lock recovery is occurring).

It is then determined whether this node is the recovery coordinator node (580 of FIG. 5H). If this node is not the recovery coordinator node, then it informs the recovery coordinator node that this node has recovered its locks in mode M (582).

If this node is the recovery coordinator node (580), then it waits for all other nodes in the membership to report that they have recovered all of their locks which they hold in mode M (584). It is then determined whether this is the last M (586). If this is not the last M, then set M=M+1 (588), and the methods shown in FIG. G is executed for the new M. If this is the last M (586), this portion of the lock recovery is finished.

FIG. 5I is a flow diagram exemplifying step 532 of FIG. 5D for recovering queued lock requests for the lock domain. In this example, it is determined whether this node is the recovery coordinator node (594). If it is not the recovery coordinator, then it awaits the recovery coordinator node's command to requeue lock requests queued when the old lock domain membership was still in effect (592). The lock requests queued when the old lock domain membership was still in effect are requeued (597).

If this node is the recovery coordinator node (594), then it sends a message to the other nodes in the membership to requeue the lock requests queued when the old lock domain membership was still in effect (596). The lock requests queued when the old lock domain membership was still in effect are requeued (597). This requeueing can be accomplished using the same mechanisms and algorithms used to acquire and queue for locks when the lock membership in unchanging and no lock recovery is occurring.

Figure 6:
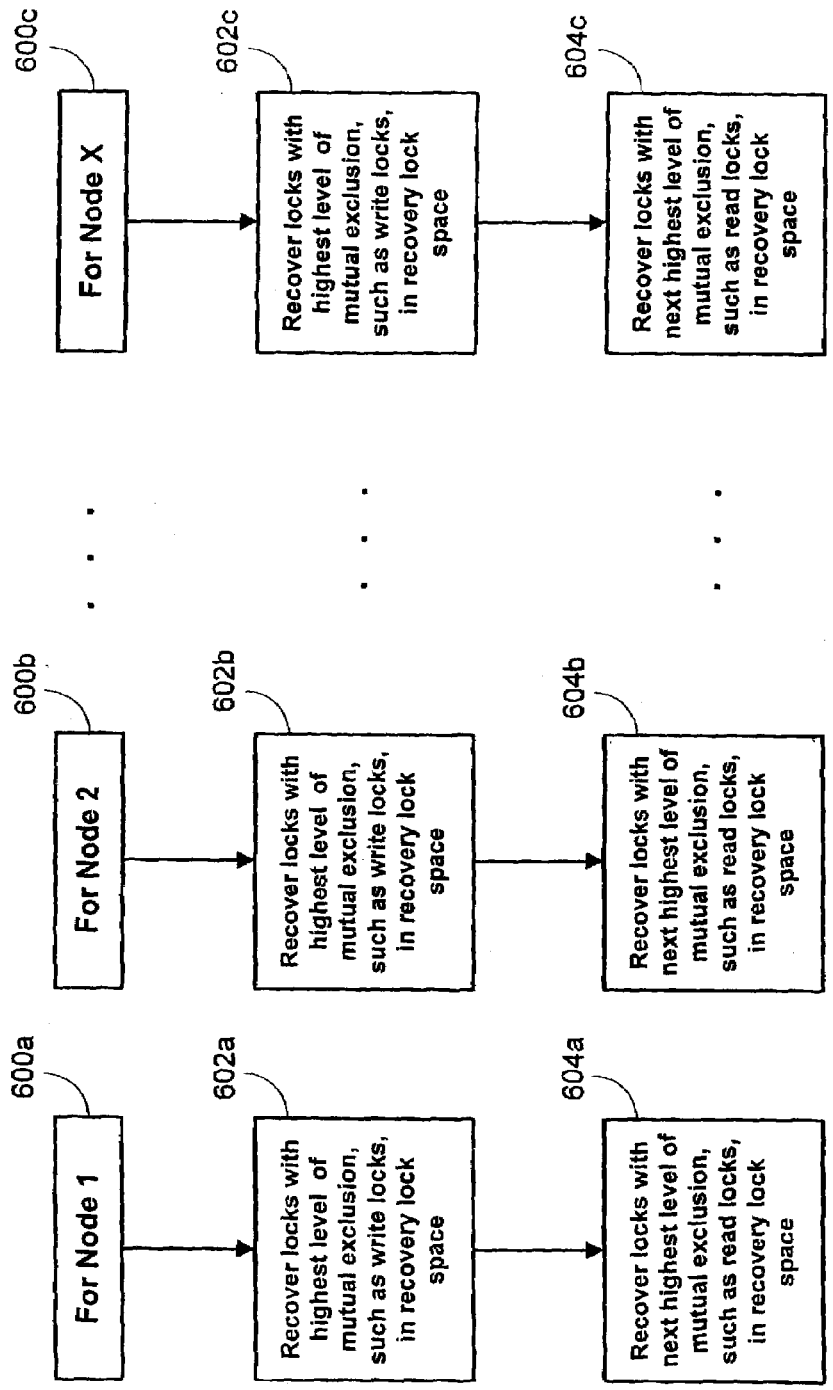
FIG. 6 are flow diagrams for parallel recovery of locks according to an embodiment of the present invention.

FIG. 6 offers further clarification of the lock recovery algorithm. FIG. 6 shows flow diagrams for recovery of locks in each node according to an embodiment of the present invention. For each node on the membership list, the following steps occur (600A-600C) in this embodiment. There may be other variations such as fewer than all of the nodes on the membership list may perform these steps.

The locks with the highest level of mutual exclusion, such as write locks are recovered in alternate lock space (602A-602C). Write locks are a higher level of mutual exclusion then read locks in this example because in simple usage, more than one node can read a file but only one node is preferably allowed to write to a file at a given time. Finer grained locking is possible, as are the support of lock mode hierarchies with more states than just read (shared) and write (exclusive). An example of a finer grained lock mode hierarchy can be found in *Private Locking and Distributed Cache Management* by David Lomet, DEC Cambridge Research Lab, Proceedings of the Third International Conference on Parallel and Distributed Information Systems (PDIS 94), Austin, Tex., Sep. 28-30, 1994.

Locks with the next highest level of mutual exclusion, such as read locks, are then recovered in alternate lock space (604A-604C). It is preferred in this embodiment to recover the write locks prior to the read locks. If there are further levels of mutual exclusion, then the recovery of those locks would take place from the highest level to the lowest level of mutual exclusion. Otherwise, lock state recovery can fail if the DLM lock recovery occurred precisely at the time a set of racing "upgrade-from-read-lock-to-write-lock-or-unlock lock X" operations were in progress.

Consider that in the case of an atomic-lock-upgrade-or-unlock operation, a lock may have been the target of a simultaneous upgrade attempt by all of the clients that held the lock in read (shared) mode. At the instant the lock domain membership changes, the target lock may have been upgraded (in this example) to write (exclusive) mode. All other racing lock upgrade attempts by all of the other nodes that held the lock in read (shared) mode fails when the recovery completes with the lock unlocked by all of the other nodes which lost the race.

Figure 7:
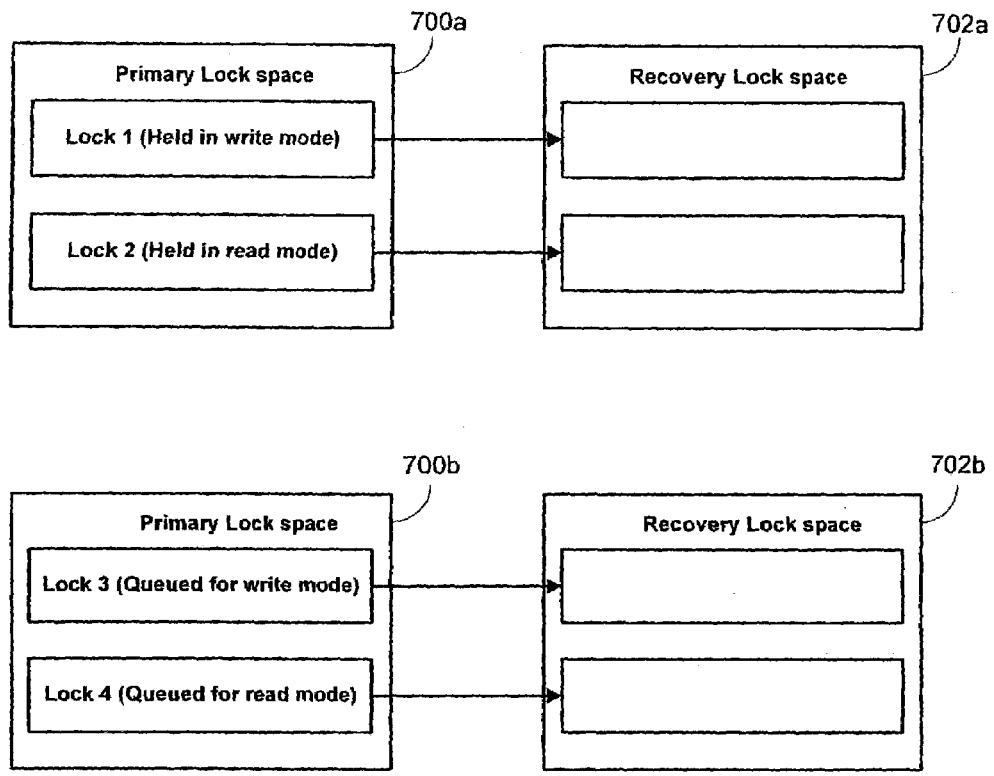
FIG. 7 shows an example of lock spaces used in recovery.

FIG. 7 shows an example of lock spaces used in recovery. In this example, each node contains at least two lock spaces; a primary lock space 700A-700B, and a recovery lock space 702A-702B. In this example, a first lock, held in write mode, is recovered into the recovery lock space 702A. Then, a second lock, held in read mode, is recovered in the recovery lock space 702A. Likewise, a third lock, queued for write mode, is recovered into the recovery lock space 702B, and a fourth lock queued for read mode is recovered in the recovery lock space 702B.

Referring now to steps 542-544 of FIG. 5C, recovery can be performed quickly because there is no need to refer to a separate file (journal) for the node to be aware of which locks it had before the crash, as the states necessary to recover the correct lock state after a membership is contained within each node's DLM. Additionally, each node recovers its own locks approximately simultaneously with the other nodes and thus the recovery process is fast. A further advantage of the method according to the present invention is that the rebalancing of locks occurs automatically when the new membership is set. The home node is calculated as though it was being calculated for the first time since this method can be used whether the members are newly formed or whether there is a change in the membership at some later time. Accordingly, when the home node is recalculated, rebalancing automatically occurs.

It is then determined whether all nodes have replayed their queued lock requests (546). Once all the nodes have replayed their queued lock requests, the recovery lock space is now made into the primary lock space and the states in the old primary lock space are destroyed (550). An example of how to turn the recovery lock space into the primary lock space is to simply implement the recovery and primary lock spaces as an instance of the same set of data structures, albeit containing different lock state information. The lock domain's concept of the current active lock space is then switched by simply exchanging the primary and recovery pointers.

There are several advantages to the present invention. For example, the present invention supports fast automated lock recovery from any type of node or shared resource failure such as single, multiple concurrent, or sequenced server or storage device failures. It supports on-line insertion of servers into the shared storage system. It also supports on-line insertion of shared storage devices, shared filesystems, and other components and services requiring DLM-coordinated access. It provides automated, on-line recovery of coordinated services (e.g., shared filesystems) due to software or hardware failure without interruption to the applications or coordinated services executing on the rest of the servers. It supports load-balancing of DLM lock service evenly across the nodes of the matrix. Additionally, it supports any number of servers, limited only by the latency and bandwidth of the selected inter-server interconnect, the servers' memory capacity, and the servers' instruction-cycle frequency. It is not dependent on the type of network or storage interconnects. The method works across a matrix of homogenous as well as heterogeneous operating systems and servers.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for recovering locks comprising:
determining a lock recovery should be performed;
determining a recovery order for a first lock and a second lock based at least in part on respective levels of exclusion of the first lock and the second lock;
recovering the first lock; and
recovering the second lock;
wherein if the recovery order is determined to be parallel recovering the first lock occurs in parallel to the recovering of the second lock, and determining the lock recovery should be performed includes determining a change has occurred to a lock domain membership associated with a list of nodes participating in lock negotiation within a given lock domain.

2. The method of claim 1, further comprising providing a first lock manager and a second lock manager.

3. The method of claim 1, wherein the first lock is recovered in a first node and the second lock is recovered in a second node.

4. The method of claim 3, wherein the first node is a server.

5. The method of claim 3, wherein the first node and the second node share a resource.

6. The method of claim 3, wherein the shared resource is a shared storage.

7. The method of claim 1, further comprising recovering a third lock after recovering the second lock, wherein the second lock has a higher level of exclusion than the third lock.

8. The method of claim 1, further comprising recovering a third lock after recovering the second lock, wherein the second lock is a write lock and the third lock is a read lock.

9. The method of claim 1, wherein the first lock is recovered from a first lock space to a second lock space.

10. The method of claim 1, wherein the determining the lock recovery should be performed occurs when a node fails.

11. The method of claim 1, wherein the determining the lock recovery should be performed occurs when a node is added.

12. The method of claim 1, wherein the determining the lock recovery should be performed occurs when a shared resource fails.

13. The method of claim 1, wherein the determining the lock recovery should be performed occurs when a network interconnect fails.

14. The method of claim 1, wherein the determining the lock recovery should be performed occurs when a shared resource is added.

15. A method for recovering a lock in a node comprising:
determining a lock recovery should be performed;
recovering a first lock; and
recovering a second lock after recovering the first lock;
wherein the second lock is recovered after the first lock at least in part due to the first lock having a higher level of exclusion than the second lock, and determining the lock recovery should be performed includes determining a change has occurred to a lock domain membership associated with a list of nodes participating in lock negotiation within a given lock domain.

16. The method of claim 15, further comprising providing a lock manager.

17. The method of claim 15, wherein the node is a server.

18. The method of claim 15, wherein the node shares a resource with a second node.

19. The method of claim 18, wherein the shared resource is a shared storage.

20. The method of claim 15, wherein the first lock is a write lock.

21. The method of claim 15, wherein the second lock is a read lock.

22. The method of claim 15, wherein the first lock is recovered from a first lock space to a second lock space.

23. The method of claim 15, wherein the determining the lock recovery should be performed includes recognizing a change in a lock domain membership.

24. A system for recovering a lock comprising:
a processor configured to determine whether a lock recovery should be performed;
recover a first lock; recover a second lock after recovering the first lock; wherein the second lock is recovered after the first lock at least in part due to the first lock having a higher level of exclusion than the second lock; and
a memory coupled to the processor, wherein the memory is configured to provide instructions to the processor;
wherein to determine the lock recovery should be performed, the processor determines a change has occurred to a lock domain membership associated with a list of nodes participating in lock negotiation within a given lock domain.

25. A system for recovering locks comprising:
a first node configured to recover a first lock;
a second node configured to recover a second lock;
a resource shared by the first and second nodes; and
a processor configured to determine a recovery order for the first lock and the second lock based at least in part on respective levels of exclusion of the first lock and the second lock;
wherein if the recovery order is determined to be parallel recovering the first lock occurs in parallel to the recovering of the second lock, and the first lock and the second lock are recovered when a change has occurred to a lock domain membership associated with a list of nodes participating in lock negotiation within a given lock domain.

26. A method for recovering locks comprising:

providing a lock manager in a first node;

providing a lock manager in a second node;

recognizing a change in a domain lock membership;

recovering a first lock in the first node; and recovering a second lock in the first node;

wherein the second lock is recovered after the first lock at least in part due to the first lock having a higher level of exclusion than the second lock, and the lock domain membership is associated with a list of nodes participating in lock negotiation within a given lock domain.

27. A method for recovering locks comprising:

recognizing a change in membership;

determining a recovery order for a first lock and a second lock based at least in part on respective levels of exclusion of the first lock and the second lock;

providing a first lock space;

providing a second lock space;

recovering the first lock; and recovering the second lock;

wherein if the recovery order is determined to be parallel recovering the first lock occurs in parallel to the recovering of the second lock, and membership is associated with a list of nodes participating in lock negotiation within a given lock domain.

28. A computer program product for recovering locks, the computer program product being embodied in a computer readable storage medium and comprising computer instructions for:

determining a lock recovery should be performed;

recovering a first lock; and recovering a second lock after recovering the first lock;

wherein the second lock is recovered after the first lock at least in part due to the first lock having a higher level of exclusion than the second lock, and determining the lock recovery should be performed includes determining a change has occurred to a lock domain membership associated with a list of nodes participating in lock negotiation within a given lock domain.

\* \* \* \* \*